ENDLESS LOOP TAPE TRANSPORT

Filed Feb. 4, 1966 2 Sheets-Sheet 1

HAROLD T. WRIGHT
INVENTOR

BY Robert S. Clay
ATTORNEY

HAROLD T. WRIGHT
INVENTOR

BY Robert G. Clay
ATTORNEY

United States Patent Office 3,356,275
Patented Dec. 5, 1967

3,356,275

ENDLESS LOOP TAPE TRANSPORT

Harold T. Wright, Belmont, Calif., assignor to Ampex Corporation, Redwood City, Calif., a corporation of California Filed Feb. 4, 1966, Ser. No. 525,185
10 Claims. (Cl. 226—195)

This invention relates to tape transports and particularly to such transports adapted for handling tape in an endless loop.

In the magnetic tap recording and reproducing art, it is frequently of advantage to arrange the tape in an endless loop. For example, it may be desirable to repeatedly play back a selected short segment of a previously recorded tape, on which instrument measurements of a phenomenon have been recorded. Sometimes it is also desired to record on such a loop. Other examples of the use of endless loops may be fund in audio and television signal recording, and also in the motion picture film machine art.

The transport mechanisms for such loops usually embody a capstan for moving the tape longitudinally, and a transducing head assembly, across which the tape must be tensioned to secure proper transducing contact.

In one form of transport, a multitude of guides are employed to arrange the body of the loop in a zig-zag path, and the entire loop is tensioned around the guides. This device requires expensive structure, and the length of the loop that can be accommodated is extremely limited.

Another form of transport employs the so-called "Cousino loop," a flat spiral coil from the inner turn of which the tape is withdrawn, crossing the coiled tape substantially along a radius of the coil and thence being returned to the outer turn of the coil. The heads and capstan may be positioned either inside or outside the coil. The tape is tensioned between the pull of the capstan and the frictional drag of the tape in the coil. However, this structure also requires expensive structure and time-consuming preparation of the tape, and is subject to many malfunctions in operation.

A third type of machine utilizes a "bin" in which the loop is stored in loose folds. That portion of the loop within the bin is therefore substantially untensioned, and the portion that is withdrawn from the bin for application to the transducing heads must be tensioned by special means. Furthermore, the bin is usually designed for application to a standard transport in place of one of the reels, and it is usually impracticable to place the tape entry port of the bin near the capstan of the transport. Consequently an auxiliary capstan is needed, near the entry port, to ensure feeding of the tape back into the bin. Such an auxiliary capstan must be operated in coordination with the main capstan, or spillage may result. The art shows many arrangements for carrying out these functions, characterized, however, by substantial complexity and cost.

It is therefore an object of the present invention to provide an endless-loop tape transport in which the loop is driven and guided by structure of novel simplicity, and in such a way that a portion thereof may be tensioned and the remainder left untensioned.

It is another object of this invention to provide a transport as above described and suitable for bin storage of the tape, with correct feeding of the tape back into the bin.

A transport in accordance with the invention includes a capstan and transducing head, a detachable bin with tape entry and exit ports, and a roller mounted on the bin near the entry port. The tape leaving the exit port is looped around the roller and is then guided in a cross over itself and thence to the head and capstan. From the capstan the tape is returned to the roller, is engaged by the inner bend of tape already thereon, and is driven back into the bin through the entry port. The tape returning to the bin tends to move faster than the tape coming out, because it is driven over the roller at a radius that is greater by one thickness of the tape. Consequently, the tape segment engaging the head is kept always in a tensioned state, and the tape within the bin may be left untensioned. The structure required is simpler, less expensive, and more easily and surely operated, than any of the structures previously known in the art.

A better understanding of the invention may be had by reference to the following description, taken in conjunction with the accompanying drawings, in which.

Figure 1:
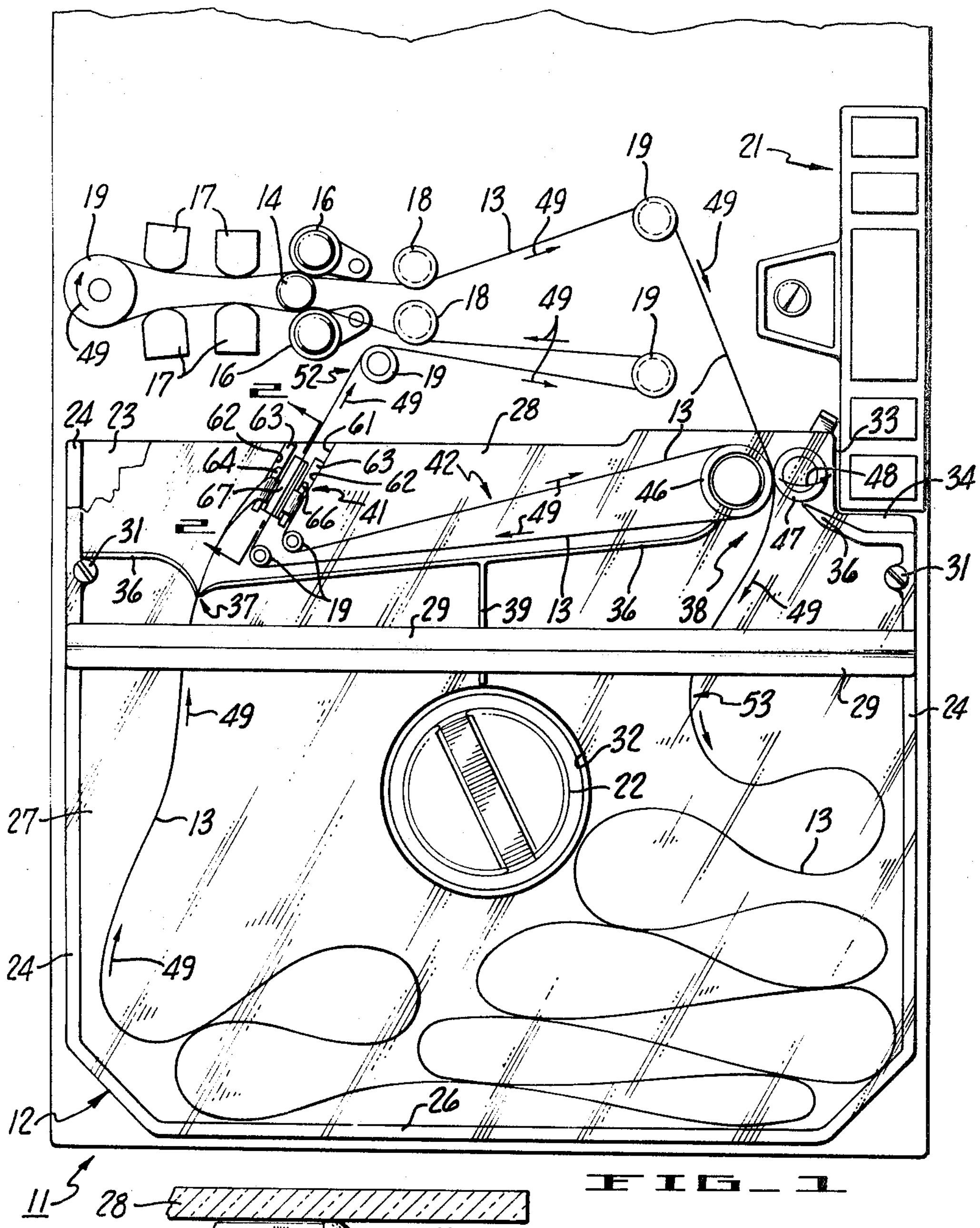
FIGURE 1 is a front elevation of a portion of a tape transport embodying the present invention.

Referring now to the drawings and particularly to FIGURE 1 thereof, there is shown a lower portion of a typical tape transport 11, on which the storage bin 12 and endless loop of tape 13 of the invention are mounted. The transport 11 includes a capstan 14, a pair of pinch rollers 16, a number of transducing heads 17, a number of guide posts 18 and rollers 19, and a control panel 21. A manually operable spindle and hold-down mechanism 22 is also shown, which is ordinarily used for mounting the lower tape storage reel of the machine. A similar spindle and hold-down mechanism is also mounted on the upper portion of the machine for the other reel, but is not shown, because the upper reel is not operated in conjunction with the invention except when the tape is being transferred therefrom into the bin during the initial formation of the tape loop 13.

Figure 2:
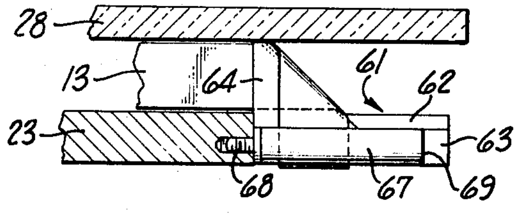
FIGURE 2 is a cross-section to an enlarged scale taken along the plane of lines 2—2 of FIGURE 1.

As shown, the bin 12 has a back wall 23, a pair of side walls 24, a bottom wall 26, and a transparent front wall 27. The upper portion 28 of the front wall 27 is arranged to fold down on a flexible plastic hinge 29 for convenience in threading the tape, and may be retained in its closed position by means of bolts 31. The dimension between the front and back walls 28, 23 of the bin is slightly greater than the transverse width of the tape, as shown in FIGURE 2. Consequently the bin is suitable for mounting in place of a reel on the lower spindle 22 of the machine, and is fitted with a hub portion 32, similar to the corresponding hub of the reel, to enable such mounting. The bin, when mounted on the spindle 22, may be restrained against rotation by any suitable means, but is here shown as restrained by engagement of a pair of re-entrant surfaces 33 and 34 bearing against corresponding portions of the control panel 21. The bin also has a top wall 36 in which are formed an exit port 37 and an entry port 38 for the tape. The portals of the exit port 37 are barely wide enough to permit the passage of one thickness of the tape, and are curled inwardly to ensure that random loops of the tape will not be inadvertently withdrawn. The portals of the entry port 38 are similarly arranged, as will be later described. A partition 39 extends from the middle of the top wall 36 to the top of the hub 32 to ensure that the tape will not become looped around the hub and entangled therewith.

Figure 3:
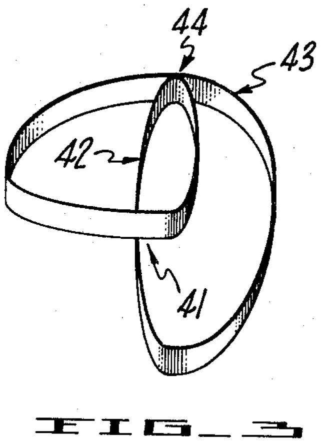
FIGURE 3 is a schematic view illustrating a principle of the invention.
Figure 4:
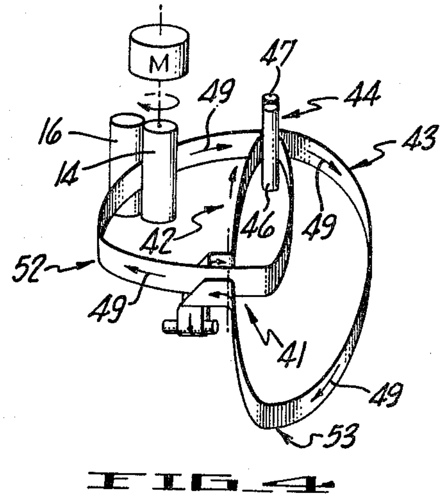
FIGURE 4 is a schematic view illustrating a principle of the invention.

Referring now to FIGURE 1 and to FIGURES 3 and 4, which represent simplified views of the tape path shown in FIGURE 1, it will be seen that the tape is guided in a path defining a cross 41 and two bends 42 and 43, the bends being defined as beginning and ending at the cross 41. In order to ensure that the tape in the vicinity of the heads 17 is tensioned, the two bends 42, 43 of the tape path are brought into curved concentric contiguity at a zone 44. In the arrangement shown, the curved concentric contiguity of the bends is provided by looping the bend 42 around hard-surfaced roller 46 with the tape of bend 42 directly engaging the surface of the roller, and by bringing the bend 43 around the roller 46 in direct engagement with bend 42. A soft-surfaced (i.e., rubber coated) pinch roller 47 is also mounted on the bin to press the two bends of tape together against the roller 46. As shown in FIGURE 1, the pinch roller 47 can be retracted for threading by pivoting it in the direction of arrow 48. As shown, the capstan 14 rotates in a clockwise direction so that the tape is moved in the direction of arrows 49. It will be seen therefore, that tape on the inner bend 49 of the curved zone defined by the roller 46 is being directly pulled by the capstan 14, and that the movement of the tape in this inner bend serves to drive the tape in the outer bend 43 between the rollers 46 and 47 and back into the bin. Since the tape in the inner bend 42 has a slightly smaller radius of curvature than the tape in the outer bend 43 at the zone 44, it follows that the arrangement tends to drive the tape in the outer bend 43 at a slightly higher linear speed than that imparted to the inner bend 42 by the capstan 14. If there were no slippage, or its equivalent between the two bends of tape in the zone 44, the difference in driving radius and linear speeds would tend to cause progressive shortening of the segment of tape coming off the inner bend in the zone 44 and moving downstream to the capstan 14 and back to the zone 44. However, the guides 18 and 19, together with the other elements 14, 16, 17 that engage this segment of the tape, define a minimum periphery for the segment, and the consequent effect is that the segment is tensioned on the guides and across the heads 17 without being further shortened, and some slippage, or its equivalent, takes place between the two bends 42, 43 in or near the zone 44. The effect is better illustrated in the exaggeratedly enlarged view of FIGURE 5. As there shown the curved zone 44 is the sector of roller 46 that is under pressure from the engagement of roller 47. Since the surface of roller 47 is deformable, the direction and degree of curvature is defined entirely by the curvature of the hard-surfaced roller 46.

In the present context, the "equivalent" of slippage is meant to include stretching and elongation of the tensioned segment of tape and a concomitant higher linear velocity thereof than is attained by the untensioned segment. It has been observed that this slippage or its equivalent that takes place in or near the curved zone 44 is substantially frictionless. Prolonged operation of the subject invention has shown extremely low frictional wear of the tape, even though one of the tape surfaces in contact at this zone is an oxide surface. In fact the amount of wear experienced by the tape is substantially of the order that would be expected from normal rubbing of the tape on the guides and against other layers of tape within the bin.

Figure 5:
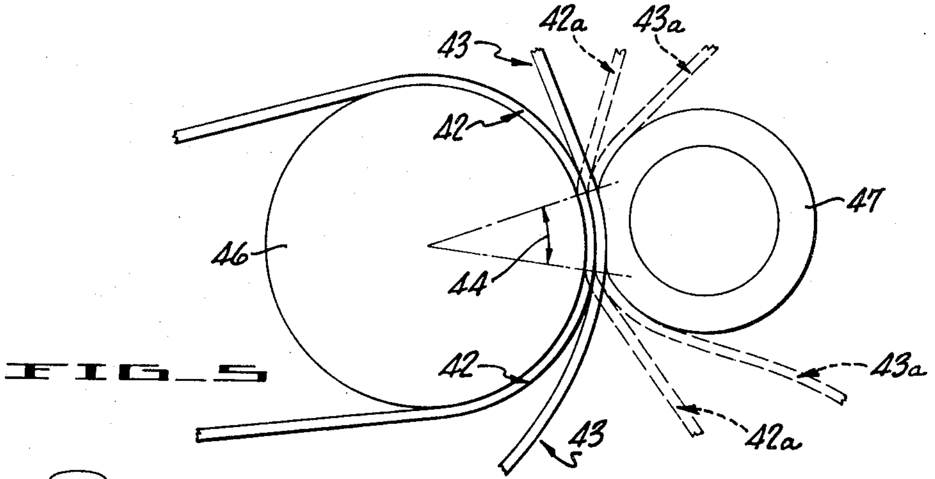
FIGURE 5 is an enlarged fragmentary view showing a portion of the invention shown in FIGURE 1.

It has also been observed in practice that even if the tape is guided so to approach the assembly of rollers 46, 47 with a reverse curvature such as is illustrated by the phantomed paths **42*a* and 43*a* in FIGURE 5, the tape across the head is still tensioned, bcause the tape layers within the pressurized curved zone 44** still have the correct curvature to provide this tensioning effect.

Referring again to FIGURE 4, it is remarked that the segment of tape that tends to be shortened and is therefore tensioned is decided by the direction of movement of the tape. With the direction of movement as shown by arrows 49, the shortened or tensioned segment is the segment 52, while the segment that tends to expand and that may be left untensioned is the segment 53 extending into the bin. If the direction of movement of tape were reversed, the segment 53 would tend to be shortened and would be tensioned, whereas the segment 52 would tend to expand. In either case however, the segment that tends to be shortened is the one defined as moving from the curved zone 44 downstream from the inner bend of the curved zone and returning to the other bend of the curved zone. It should also be noted that the "segments" referred to are not conextensive with the "bends" described above. The bends 42, 43 are each defined as beginning and ending at the cross 41, whereas the segments 52, 53 are each defined as beginning and ending at the curved zone 44. While the determination of which segment is to be shortened or tensioned is dependent on the direction of movement of the tape, this determination is independent of the placing of the tape driving means 14, 16. The tape driving means 14, 16 can be placed at any point on the tape, engaging either of the bends 42, 43, or either of the segments 52, 53. In fact, either or both of the rollers 46, 47 could be driven by a motor so as to constitute the tape driving means, without any change in the effect. However, in the present invention as adapted for use with a bin storage device, the capstan 14 of the basic transport is located in such a position that the entrance port 38 of the bin cannot conveniently be placed immediately adjacent the capstan, and some form of tape driving means is needed at the entry port 38 to ensure that no slack or spillage will occur in the tape between the capstan and entry port 38. Previously in the art, such auxiliary tape driving means have been placed at the entry port, but have had either to be separately powered or driven by some form of coordinating linkage from the main capstan and its drive means. In the present invention, extreme simplicity is achieved in that the tape driving means 46, 47 is driven directly by the tape, which in turn is driven by the capstan 14, and the differential drive arrangement described above ensures that the unit mass of tape entering the bin per unit time is not less than the unit mass of tape passing the capstan 14 per unit time, so that no slack can occur in the tape until it actually enters the bin. As shown in FIGURE 1, the upper wall 36 of the bin, on either side of the entry port 38, is curved in such a way as to engage the tape path of the inner bend of tape coming out of the curved zone 44, and the surface of the pinch roller 47, so that random loops of tape from the bin are not drawn out by rotation of the rollers 46, 47.

While the guides 18, 19, the heads 17 and the pinch rollers 16 are shown in FIGURE 1 as defining a complicated path for the tape outside the bin, it should be remarked that these guides are used as shown in the present invention because they are present on the basic transport, and it is more convenient to use them than not. For example, the guides 18 farthest to the right in the drawing may be spring loaded tension arms for the purpose of regulating and measuring the tension in the tape as by displacement against a spring force. Further, the particular form of capstan 14 shown, engaging the tape on both sides of its passage across the heads 17, is not essential to the invention, but in the illustrated arrangement does produce an effect of reducing flutter in the tape at the heads, this effect being cumulative with the flutter reducing effect provided by the pinch mechanism 46, 47 of the invention, in isolating the tape at the heads from the effects of pertubations in other parts of the machine. In actual practice, the measurable flutter of the tape at the heads, with the bin of the present invention installed, is substantially less than the flutter produced when the machine is operated with standard reels of tape. Essentially however, there need be no elements engaging the tape outside the bin beyond a single head 17 and the capstan 14, providing that at least one of these elements is inside the circuit defined by the tape segment 52 so as to define a minimum inner periphery for the segment, to limit its shrinkage and cause tensioning of the segment. If neither the head nor the capstan is inside the circuit of the segment, then at least one single guide is needed inside the circuit.

The structure by which the cross 41 is effected is illustrated in FIGURES 1 and 2. A recess or slot 61 is formed in the back wall 23 of the bin, and against the inner sides 62 of this slot, and on a pair of shelves or ledges 63, are mounted a pair of 45-degree-triangle guides 64, 66. In the lower portion of the slot 61, and parallel to the left of the slot, is mounted a freely rotating roller 67. The tensioned segment 52 of the tape coming off the inner bend of the curved zone 44 is guided around the roller 19 and out of the bin on a path such that the roller 67 lies in the same plane as this portion of the tensioned segment and parallel to one edge thereof, and so that the guides 64, 66 are arranged in planes parallel to this portion of the segment and on opposite sides thereof, with the hypotenuses of the guides diagonally transverse to the width of the tape in the segment. The remaining or untensioned segment 53 of the tape moving downstream from the outer bend of the zone 44, passes through the bin, out the exit port 37, thence in a fold over the hypotenuse of guide 64, thence in a 180° turn around the roller 67, thence in a fold over the hypotenuse of guide 66, thence around a roller 19 and back to the inner bend of the zone 44. To facilitate the threading of the tape, the roller 67 is mounted on a cantilever shaft 68 that extends from the back wall 23 of the bin so as to present one free end 69 for looping of the tape thereover, between the guides 64, 66.

Figure 6:
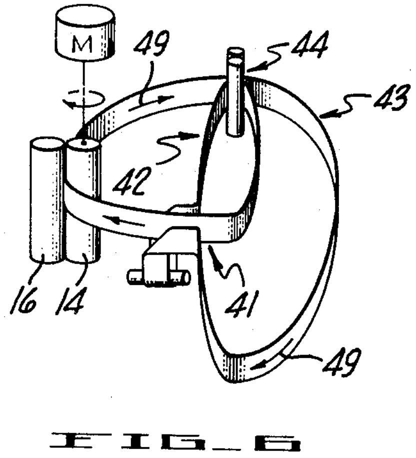
FIGURE 6 is a schematic view illustrating a principle of the invention.
Figure 7:
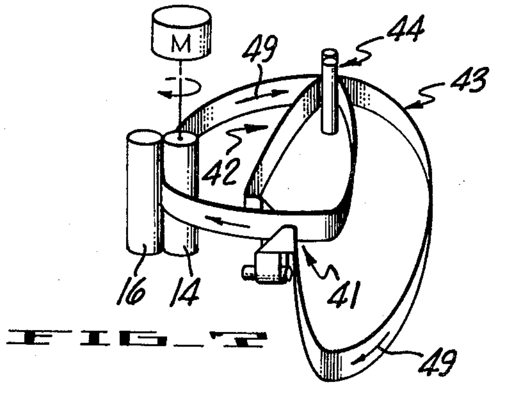
FIGURE 7 is a schematic view illustrating a principle of the invention.

As illustrated in FIGURES 1, 3 and 4, the endless loop of tape is formed with one full twist of 360°, so as to define the bend 42 as being inside the bend 43. By turning this configuration inside out, the loop may be arranged in the form of a "figure 8," but nevertheless still may be described as having a cross and two bends. For a "figure 8" configuration, an equivalent guiding arrangement can be devised, as will be appreciated by those skilled in the art. Furthermore, the endless loop may be formed without a twist as illustrated in FIGURE 6 is desired. However in such event, one of the triangular guides (guide 66) must be mounted so as to leave a space between the guide and the adjacent side wall of the slot for upward passage of the tape coming from the roller 67. Likewise, the endless tape loop may be formed as a Mobius loop i.e., with a half or 180° twist as illustrated in FIGURE 7, in which case the triangular guides must be arranged with their hypotenuses oppositely directed. Other arrangements will be apparent to those skilled in the art without departing from the scope of the invention.

Thus there has been described a transport in accordance with the invention including a capstan and transducing head, a detachable bin with tape entry and exit ports, and a roller mounted on the bin near the entry port. The tape leaving the exit port is looped around the roller and is then guided in a cross over itself and thence to the head and capstan. From the capstan the tape is returned to the roller, is engaged by the inner bend of tape already thereon, and is driven back into the bin through the entry port. The tape returning to the bin tends to move faster than the tape coming out, because it is driven over the roller at a radius that is greater by one thickness of the tape. Consequently, the tape segment engaging the head is kept always in a tensioned state, and the tape within the bin may be left untensioned. The structure required is simpler, less expensive, and more easily and surely operated, than any of the structures previously known in the art.

What is claimed is:

1. In a transport for an endless loop of tape, the combination comprising:
- means for guiding said tape in a path defining a cross and two bends, said path including a zone in which said bends are in curved concentric contiguity;
- means for causing pressurized frictional engagement of the respective portions of tape in said zone; and
- means for moving said tape longitudinally around said path and through said zone;

- whereby the segment of tape moving downstream from the inner bend of said zone and back to the outer bend of said zone tends to be shortened.

2. The combination recited in claim 1, wherein:
- said guiding means includes means defining a minimum inner periphery for said segment of tape;
- whereby said segment is tensioned around said last-named means.

3. The combination recited in claim 2, wherein:
- that portion of said guiding means that defines said cross includes a pair of 45-degree-triangle guides arranged in planes parallel to a portion of said tensioned segment and on opposite sides thereof and with the hypotenuses of said guides diagonally transverse to the width of said tensioned segment, and a roller mounted in the same plane as said portion of said tensioned segment and parallel to one edge thereof;
- said roller being mounted on a cantilever shaft so as to present one free end for looping of said tape thereover during the process of threading said tape on said transport;
- the remaining segment of said tape moving downstream from the outer bend of said zone being guided in a fold over the hypotenuse of one of said guides, thence in a 180-degree turn around said roller, thence in a fold over the hypotenuse of the other of said guides, and thence downstream to the inner bend of said zone, said remaining segment being an untensioned segment of said tape.

4. The combination recited in claim 2, wherein:
- that portion of said tape guiding means that defines said curved zone is a hard-surfaced roller; and
- said means for causing frictional engagement is a soft-surfaced pressure roller for pinching said bends of tape against said hard-surfaced roller throughout said zone.

5. The combination recited in claim 2, wherein:
- said means for moving said tape is a motor-driven capstan mounted for pressurized frictional engagement with said tensioned segment of tape; and
- said transport means defining a minimum inner periphery for said tensioned tape segment includes transducing means engaging said tensioned segment.

6. The combination recited in claim 2, wherein:
- said transport includes a detachable folded-tape storage bin having tape entry and exit ports;
- that portion of said guiding means that defines said curved zone, and said means for causing pressurized frictional engagement of said bends, being mounted on said bin adjacent said tape entry port thereof;
- that portion of said guiding means that defines said cross being mounted on said bin adjacent said tape exit port thereof; and
- said means for moving said tape being mounted on said transport outside said bin and adjacent said ports thereof.

7. The combination recited in claim 2, wherein said endless loop is a simple cylindrical loop.

8. The combination recited in claim 2, wherein said endless loop is formed with a 180-degree twist.

9. The combination recited in claim 2, wherein said endless loop is formed with a 360-degree twist.

10. The combination recited in claim 1, wherein:
- said transport includes a detachable folded-tape storage bin having tape entry and exit ports;
- a portion of said tape guiding means including a transducing head is mounted on said transport adjacent said bin ports and at least partly within the circuit of said segment of tape moving downstream from the inner bend of said zone and back to the outer bend of said zone, whereby said segment is tensioned across said head;
- that portion of said tape guiding means that defines said curved zone is a hard-surfaced roller mounted on said bin adjacent to and outside said entry port and on the side thereof facing said exit port;

said means for causing frictional engagement is a soft-surfaced pressure roller mounted on said bin adjacent said hard-surfaced roller and on the other side of said entry port for pinching said bends of tape against said hard-surfaced roller throughout said zone;

that portion of said guiding means that defines said cross includes a pair of 45-degree-triangle guides mounted on said bin adjacent to and outside said exit port and arranged in planes parallel to a portion of said tensioned segment and on opposite sides thereof and with the hypotenuses of said guides diagonally transverse to the width of said tensioned segment, and a roller mounted on said bin in the same plane as said portion of said tensioned segment and parallel to one edge thereof;

said roller being mounted on a cantilever shaft extending from said bin so as to present one free end for looping of said tape thereover during the process of threading said transport;

the remaining segment of said tape moving downstream from said hard-surfaced roller and the outer bend of said zone being guided through said entry port and into said bin, thence through said exit port and out of said bin, thence in a fold over the hypotenuse of one of said guides, thence in a 180-degree turn around said roller, thence in a fold over the hypotenuse of the other of said guides, and thence downstream to said hard-surfaced roller and the inner bend of said zone, said remaining segment being an untensioned segment of said tape; and said means for moving said tape is a motor-driven capstan mounted on said transport adjacent to and outside said ports of said bin for pressurized frictional engagement with said tensioned segment of tape.

References Cited

UNITED STATES PATENTS

| | | | |
|---|---|---|---|
| 2,499,700 | 3/1950 | Tinkham | 226—195 X |
| 3,122,294 | 2/1964 | Laa | 226—188 X |

M. HENSON WOOD JR., *Primary Examiner.*

R. A. SCHACHER, *Examiner.*